United States Patent Office 3,358,032
Patented Dec. 12, 1967

3,358,032
NUCLEAR HYDROCARBYLOXY DERIVATIVES
OF 2-ALKYLIDENEALKANOPHENONES
Everett M. Schultz, Ambler, and Edward J. Cragoe, Jr.,
Lansdale, Pa., assignors to Merck & Co., Inc., Rahway, N.J., a corporation of New Jersey
No Drawing. Filed Jan. 29, 1965, Ser. No. 429,153
17 Claims. (Cl. 260—592)

This invention relates to a new class of pharmacologically active organic compounds which can be described generally as nuclear hydrocarbyloxy derivatives of 2-alkylidenealkanophenones.

Pharmacological studies show that the products of the invention are effective diuretic and saluretic agents which can be used for the treatment of conditions associated with electrolyte and fluid retention. When administered in therapeutic dosages in conventional vehicles, the instant products effectively reduce the concentration of sodium and chloride ions in the body, lower dangerous excesses of fluid levels to acceptable levels and, in general, ameliorate conditions associated with renal dysfunction.

The products of the invention are lower alkyl, lower alkenyl and lower alkynyl ethers of 2-alkylidenealkanophenones having the following structural formula:

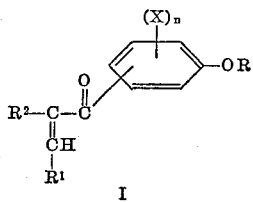

wherein R is a member selected from the group consisting of lower alkyl, for example, methyl, ethyl, propyl, butyl, etc., lower alkenyl, for example, a radical of the formula: $-CH_2-CH=C(R^3)(R^4)$ and lower alkynyl, for example a radical of the formula: $-CH_2-C\equiv CR^5$, wherein $R^3$, $R^4$ and $R^5$ each represent similar or dissimilar radicals selected from the group consisting of hydrogen and an hydrocarbyl group, i.e., a monovalent organic radical composed solely of carbon and hydrogen such as lower alkyl, for example, methyl, ethyl, propyl, isopropyl, amyl, etc., aryl, for example, phenyl, p-tolyl, naphthyl, etc. or aralkyl, for example, benzyl, phenylethyl, phenylpropyl, naphthylmethyl, etc.; $R^1$ is a member selected from the group consisting of hydrogen and lower alkyl, for example, methyl, ethyl, isopropyl, butyl, etc.; $R^2$ is a member selected from the group consisting of hydrogen, lower alkyl, for example, methyl, ethyl, propyl, isopropyl, butyl, pentyl, etc., halo-lower alkyl such as trifluoromethyl-lower alkyl such as 2,2,2-trifluoroethyl, 2,2,2-trifluoroisopropyl, etc., cycloalkyl, for example, mononuclear cycloalkyl containing three to six nuclear carbon atoms such as cyclobutyl, cyclopentyl, cyclohexyl, etc., aryl such as mononuclear aryl and aralkyl such as mononuclear aralkyl wherein the aromatic ring in the said aryl and aralkyl moieties may be optionally substituted by halogen, for example, chlorine, etc., or lower alkyl, for example, methyl, ethyl, etc.; X represents one or more similar or dissimilar radicals selected from the group consisting of hydrogen, halogen, trihalomethyl such as trifluoromethyl-lower alkyl and, when substituted on adjacent carbon atoms of the benzene nucleus, two X radicals may be combined to form an hydrocarbylene chain, i.e., a divalent organic radical composed solely of carbon and hydrogen, containing from three to four carbon atoms between their points of attachment, for example, tetramethylene, i.e., ($-CH_2-CH_2-CH_2-CH_2-$), 1,3 - butadienylene (i.e., $-CH=CH-CH=CH-$), etc.; and $n$ is an integer having a value of 1–4.

A preferred embodiment of the invention relates to the 2-methylenealkanophenone ethers of the formula:

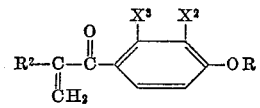

wherein R is a member selected from the group consisting of lower alkyl, a lower alkenyl radical of the formula: $-CH-CH=C(R^6)(R^7)$ and a lower alkynyl radical of the formula: $-CH_2-C\equiv CR^8$ wherein $R^6$, $R^7$ and $R^8$ each represent similar or dissimilar radicals selected from the group consisting of hydrogen and lower alkyl; $R^2$ is a member selected from the group consisting of lower alkyl and trihalomethyl-lower alkyl; and $X^2$ and $X^3$ each represent similar or dissimilar radicals selected from the group consisting of hydrogen, halogen and lower alkyl. The above class of compounds exhibits particularly good diuretic and saluretic activity and represents a preferred subgroup within the scope of this invention.

Most of the products of this invention, i.e. the ethers of 2-methylenealkanophenones, are conveniently prepared from the corresponding etherified alkanophenone derivatives by treating the said alkanophenones with formaldehyde or paraformaldehyde and the acid addition salt of a secondary amine and decomposing the Mannich amine salt thus formed. According to this method an alkanophenone, illustrated by planar Formula II, infra, is first allowed to react with formaldehyde or paraformaldehyde and the acid addition salt of a di-lower alkylamine, piperidine or morpholine and the Mannich amine salt (III) thus formed is then converted directly to the corresponding 2-methylenealkanophenone ether (I) by decomposition as, for example, by heating the said Mannich salt at temperatures above room temperature and preferably in the presence of a solvent of high dielectric constant such as dimethylformamide or, alternatively, treating the salt of the Mannich amine (III) with a weak base such as sodium bicarbonate, to obtain the corresponding free Mannich amine derivative (IV) which is then decomposed to the desired 2-methylenealkanophenone ether (I). Some of the Mannich amines (IV) decompose at ambient temperatures but generally decomposition is advantageously effected by slight heating. The following equation illustrates this method of preparation:

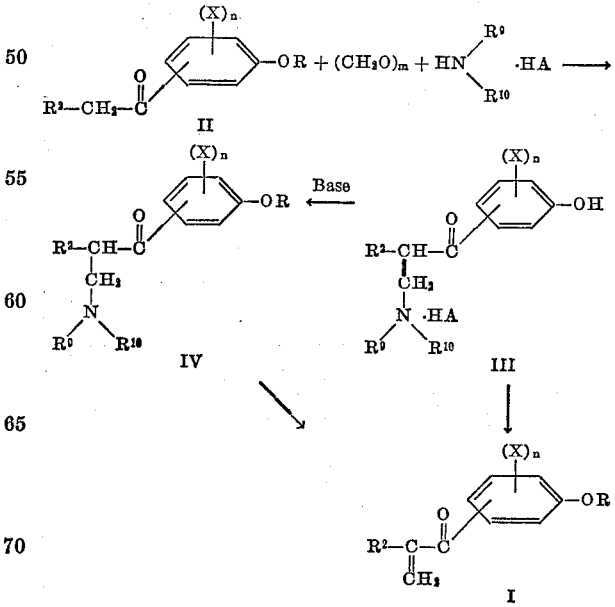

wherein R, R², X and n are as defined above; HNR⁹R¹⁰ represents a secondary amine, for example, an amine selected from the group consisting of di-lower alkylamine, piperidine and morpholine; HA is the moiety derived from an organic or inorganic acid capable of forming salts with amines, for example, hydrochloric acid, etc.; and m is the integer 1 or a number greater than 1.

An alternate method for preparing the nuclear alkyl, alkenyl and alkynyl ethers of 2-methylenealkanophenone (I) also comprises treating an appropriate etherified alkanophenone (II) with formaldehyde or paraformaldehyde and the salt of a secondary amine but, unlike the foregoing method which converts the Mannich amine salt (III, supra) thus formed to the corresponding free Mannich amine (IV, supra) and then to the desired product (I), this alternate method consists in treating the Mannich amine (IV) with a suitable quaternizing agent to obtain the corresponding quaternary ammonium salt (V, infra) and then converting the said quaternary ammonium derivative to the desired ether of the 2-methylenealkanophenone (I) by treatment with a base, for example, with an aqueous solution of sodium bicarbonate. The following equation illustrates this method of preparation:

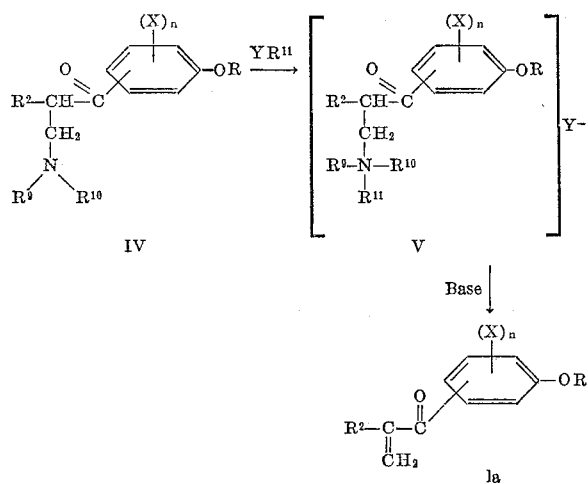

wherein R, R², X and n are as defined above and each of R⁹ and R¹⁰ represents a member selected from the group consisting of lower alkyl and, taken together with the nitrogen atom to which they are attached, a mononuclear heterocyclic ring selected from the group consisting of piperidino and morpholino; YR¹¹ represents an hydrocarbyl halide, i.e., the halide derivative of an organic compound composed solely of carbon and hydrogen, for example, methyl bromide, methyl iodide, etc.; R¹¹ represents an hydrocarbyl radical, for example, lower alkyl, etc.; and Y⁻ represents the anion derived from an hydrocarbyl halide, for example, a bromide ion, an iodide ion, etc.

Another method for preparing the etherified 2-alkylidenealkanophenones (I) and one which is particularly suitable for preparing those products wherein the R¹ moiety is a lower alkyl radical, comprises treating a suitable ether of an alkanophenone (VI, infra) with an halogenating agent, for example, chlorine, bromine, iodine monochloride, etc.; followed by the reaction of the halogenated derivative (VII) thus produced with a dehydrohalogenating agent. Dehydrohalogenating reagents which are suitable in the process include, for example, tertiary amines, metal halides, alkali metal acetates, alkali metal carbonates, etc. Specifically, triethylamine, anhydrous lithium chloride, lithium bromide, silver acetate, potassium acetate, silver fluoride and potassium carbonate have been found to be particularly effective in the dehydrohalogenation reaction. The process is illustrated by the following equation:

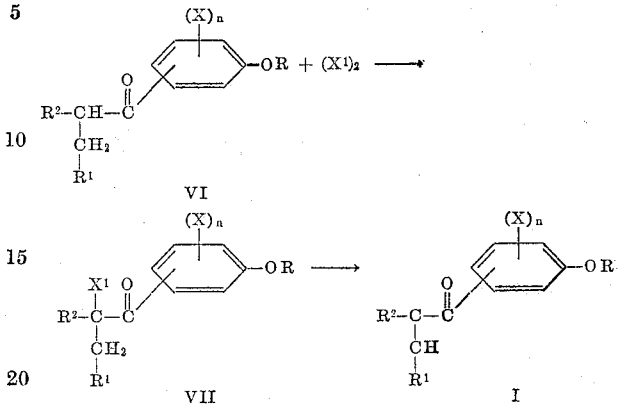

wherein R, R¹, R², X and n are as defined above; X¹ represents an halogen atom, for example, a chlorine atom, a bromine atom, an iodine atom, etc.; and (X¹)₂ represents an halogenating agent as, for example, chlorine, bromine, iodine monochloride, etc. In general, the dehydrohalogenation reaction may be carried out in any inert solvent in which the 2-haloalkanophenone (VII) and dehydrohalogenating agents are reasonably soluble; for example, in dimethylformamide, especially when lithium chloride or lithium bromide is the dehydrohalogenating agent employed.

When the R² moiety in the 2-alkylidenealkanophenone ethers (VI) of the preceding paragraph is a radical containing at least one hydrogen atom on the alpha carbon as, for example, where R² is a R¹²R¹³CH— group wherein R¹² and R¹³ each represents a member selected from the group consisting of lower alkyl, halo-lower alkyl, aryl, aralkyl, and, taken together with the carbon atoms to which they are attached, the R¹² and R¹³ groups may be joined to form a cycloalkyl ring, particularly a cycloalkyl ring containing three to six nuclear carbon atoms, the reaction may take an alternate course resulting in the formation of an isomeric product having the following formula:

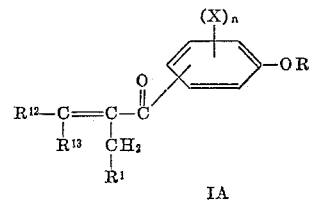

wherein R, R¹, R¹², R¹³, X and n are defined above. Also, in lieu of obtaining the desired ether of 2-alkylidenealkanophenone (I) or the isomeric derivative depicted above as IA it is possible that an isomeric mixture of products (i.e., I and IA) may be obtained.

Another method for the synthesis of the ether derivatives (I) of the invention consists in the reaction of a 4'-hydroxy-2-alkylidenealkanophenone (VIII) with an etherifying agent:

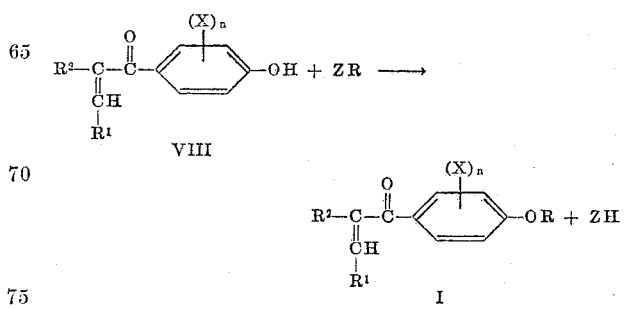

wherein R, R¹, R², X and $n$ are as defined above and Z is an halogen or inorganic acid ester radical (e.g., $ROSO_2^-$). Thus, ZR may represent, for example, an alkyl halide (e.g., alkyl iodide), alkenyl halide, alkynyl halide, alkyl sulfate, aralkenyl halide, etc. Usually, the foregoing etherification reaction is carried out by first preparing an alkali metal salt of the phenol reactant (VIII) (prepared by treating the phenol with an alkali metal alkoxide) and then adding the etherification agent to the phenolate to form the corresponding nuclear ether (I) of the 2-alkylidenalkanophenone. The reaction is usually carried out in an organic solvent such as in a lower alkanol (e.g., methanol) or dimethylformamide. When an alkali metal alkoxide is not used to prepare the alkali metal salt of the phenol reactant, it is advantageous to employ some other acid acceptor in lieu thereof such as an alkali metal carbonate (e.g., potassium carbonate).

The 4'-hydroxy - 2 - alkylidenealkanophenone reactants (VIII) of the foregoing reaction are advantageously prepared by the methods described in my copending U.S. patent application Ser. No. 361,932, filed Apr. 20, 1964.

The nuclear etherified alkanophenones (II and VI) which are employed as starting materials in the foregoing reactions, are either known compounds or may be prepared by methods which are known to those skilled in the art. One method involves the Friedel Crafts reaction of an appropriate nuclear substituted or nuclear unsubstituted phenol ether such as an appropriate nuclear substituted or nuclear unsubstituted anisole or phenetole, with an alkanoic acid halide in the presence of a metallic halide to produce the corresponding nuclear etherified alkanophenone (II) and (VI). The etherified alkanophenone (II, VI) thus obtained can then be used directly in the foregoing reactions. Metallic halides which may be used in the Friedel Crafts reaction include, for example, anhydrous aluminum chloride, etc.

It frequently occurs that the foregoing Friedel Crafts reaction produces a mixture of the 2'- and the 4'-isomers of the desired alkanophenone-ethers as, for example, when the phenol-ether reactant employed is a 3-chloroanisole, 3-methylanisole, etc. In such an instance it is preferable to make no attempt at separating the 2'- and 4'-substituted ethers of the alkanophenone; instead, the isomeric mixture is converted to a mixture of the corresponding isomeric nuclear hydroxy substituted alkanophenones and the said phenones are separated by fractional distillation. The desired nuclear hydroxyalkanophenones may then be etherified by conventional means to the corresponding pure ether compounds (II and VI).

Another method for preparing the nuclear alkoxy and nuclear alkenyloxy substituted alkanophenone derivatives (II and VI) consists in the reaction of a Grignard reagent of the formula: $R^2-CH_2M_gX^4$ or $R^2-CH(CH_2R^1)M_gX^4$ wherein the radicals R¹ and R² are as defined above and $X^4$ represents an halogen atom, for example, chlorine, bromine, etc., with an appropriate formyl substituted phenol-ether of the formula:

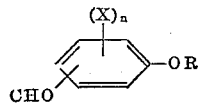

wherein R is a member selected from the group consisting of lower alkyl and lower alkenyl and X and $n$ are as defined above. The nuclear alkoxy or alkenyloxy substituted benzyl alcohol intermediates thus produced may then be oxidized to the corresponding ketones (II and VI). Oxidizing agents suitable for use in the process include, for example, chromium trioxide, etc. Although the Grignard reaction may be used to prepare all of the nuclear alkoxy and alkenyloxy substituted alkanophenone (II and VI) reactants, this method of preparation is most suitable for preparing the 3'-alkoxy- and 3'-alkenyloxy-alkano-phenone isomers. For example, a 3-formylanisole reacts with the appropriate Grignard reagent to produce the corresponding 3'-methoxy substituted benzyl alcohol and the said alcohol may then be oxidized to the corresponding 3'-methoxy-alkanophenone (II or VI).

The nuclear etherified alkanophenone starting materials (II and VI) may also be prepared by the Fries rearrangement which comprises treating a phenol with an acid halide to produce the corresponding phenol-ester, followed by the heating of the said ester with aluminum chloride to effect a nuclear rearrangement which produces the corresponding nuclear hydroxy substituted alkanophenone. The nuclear hydroxy substituted alkanophenone thus obtained may then be etherified by conventional means to obtain the corresponding alkoxy, alkenyloxy and alkynyloxy substituted alkanophenones (II and VI). The foregoing method of preparation is most suitable for preparing those alkanophenone reactants of the invention which contain the ether group in the 2' position of the alkanophenone nucleus but those skilled in the art will perceive that the Fries method of rearrangement may also be used to prepare the 4'-alkoxy-, 4'-alkenyloxy- and 4'-alkynyloxy-alkanophenone isomers under the appropriate conditions. For example, a phenol containing a nuclear substituent in the 2- and 6- positions, such as a 2,6-dichlorophenol, may be allowed to react with an appropriate acid halide to produce the corresponding acid ester of the phenol, the said ester may then be converted to the desired 4'-hydroxy-alkanophenone by heating in the presence of aluminum chloride and the 4'-hydroxy-alkanophenone converted to the desired ether in the usual manner.

A preferred method for preparing the 3'-alkoxy-, 3'-alkenyloxy- and 3'-alkynyloxy-alkanophenone starting materials (II and VI) consists in first nitrating an appropriate nuclear substituted or nuclear unsubstituted alkanophenone by conventional means as, for example, with fuming nitric acid, to produce the corresponding 3'-nitro-alkanophenone intermediate; reducing the said nitro derivative to its amine counterpart, converting the amine to the 3'-hydroxyalkanophenone derivative and then etherifying the said nuclear hydroxy substituted alkanophenone to the desired ether (II or VI) in the conventional manner.

Still another method for the synthesis of the etherified alkanophenone reactants (II and VI) comprises treating a 4-bromophenol with an alkali metal hydroxide to obtain the corresponding alkali metal phenolate (IX), followed by the reaction of the resulting phenolate with a suitable alkyl halide, alkenyl halide or alkynyl halide to obtain the corresponding 4-bromophenol-ether (X); the halogenated phenol-ether thus obtained then is allowed to react with magnesium metal in an ether solution, the reaction mixture treated with a suitable aldehyde, such as an aldehyde of the formula: $R^2-CH_2CHO$ wherein R² is as defined above, and the 4-(1-hydroxyalkyl)phenol-ether thus produced is oxidized in the presence of chromium trioxide, or other suitable oxidizing agent, to obtain the corresponding etherifie alkanophenone (II and VI). The following equation illustrates this method of preparation:

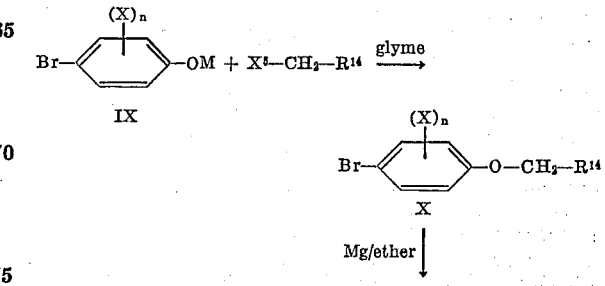

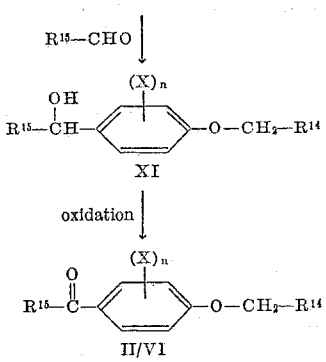

wherein X and $n$ are as defined above, with the proviso that the radical X represents a substituent other than bromine or iodine; M represents the cation of an alkali metal hydroxide, for example, a sodium or potassium cation; $R^{14}$ represents a member selected from the group consisting of alkyl, an alkenyl radical of the formula: —CH=C($R^3$)($R^4$) or an alkynyl radical of the formula: —C≡C$R^5$, wherein $R^3$, $R^4$ and $R^5$ are as defined above, $R^{15}$ represents a member selected from the group consisting of $R^2$—CH$_2$— and $R^2$—CH(CH$_2$$R^1$)—, wherein $R^1$ and $R^2$ are as defined above and $X^5$ represents an halogen atom, for example, chlorine, bromine, etc.

The preparative method described in the preceding paragraph is a most advantageous method for the preparation of the nuclear trifluoromethyl substituted alkenyl ethers of alkanophenone (II and VI). However, it should be understood that the process is not limited to the preparation of the nuclear trifluoromethyl substituted alkenyloxyalkanophenone compounds but is in fact suitable for preparing other of the starting materials of the invention.

The examples which follow illustrate the 2-alkylidene-alkanophenones of the invention and the method by which they are prepared. However, the examples are illustrative only and it will be apparent to one having ordinary skill in the art that all of the products embraced by Formula I, supra, may be prepared in an analogous manner by substituting the appropriate starting materials for those set forth in the examples.

EXAMPLE 1

*2-methylene-2'-chloro-4'-allyloxybutyrophenone*

STEP A.—3-CHLOROANISOLE

A three liter 4-necked flask is fitted with a mechanical stirrer, reflux condenser, thermometer and two graduated dropping funnels. The flask is charged with 10 N sodium hydroxide (200 ml., 2 mole), methanol (440 ml.) and m-chlorophenol (257 g., 2 mole). The flask is fitted with a steam bath, the stirrer is started and the steam regulated so that a gentle reflux is maintained throughout the reaction period. The initial reaction temperature is 55–60° C.; at the end it is 75–80° C.

One dropping funnel is charged with methyl sulfate (652 ml., 880 g., 6.98 mole) and the other with 10 N sodium hydroxide (500 ml., 5 mole). The two solutions are added simultaneously to the reaction mixture taking care that the mixture remains alkaline throughout the reaction period. The addition requires 2½ hours.

After refluxing for an additional hour, the mixture is cooled and poured into cold water (2 liters). The upper, organic phase, is separated in a separatory funnel and the aqueous phase thrice extracted with 400 ml. portions of ether. The combined ether and organic phases are dried over anhydrous sodium sulfate.

The ether is removed by distillation and the residue fractionated at reduced pressure using a still with a 30 inch column. The fraction boiling at 65–67° C./7–8 mm. (78–80° C./15 mm. or 81–83° C./18–20 mm.) is collected. The yield varies from 263 g. (92%) to 281 g. (99%) of 3-chloroanisole.

STEP B.—2'-CHLORO-4'-METHOXYBUTYROPHENONE

A 2-liter resin flask is fitted with a mechanical stirrer, thermometer, reflux condenser capped with a calcium chloride drying tube and an Erlenmeyer flask attached via Gooch tubing. The apparatus is oven dried and assembled while hot. The system is flushed with dry nitrogen and petroleum ether (750 ml.) (Merck's Benzin, B.P. 30–60° C. which had previously been dried overnight over some anhydrous aluminum chloride) is placed in the flask. 3-chloroanisole (213.9 g., 1.5 mole) and butyryl chloride (191.8 g., 1.8 mole) are added and the stirrer started. Anhydrous aluminum chloride (200 g., 1.5 mole) is placed in the Erlenmeyer flask and added, portionwise, to the reaction mixture over 30 minutes.

The reaction mixture gradually changes from a pale yellow color to dark orange. Finally a red oil begins to separate. After the addition is complete, stirring is continued for another 2 hours. Throughout the entire period of reaction, there is a vigorous evolution of hydrogen chloride, During the reaction, the temperature does not exceed 30° C.

The reaction mixture now consists of two layers. The upper, benzin layer, is decanted off and discarded. The viscous bottom layer is poured into a mixture of crushed ice (1 kg.) and concentrated hydrochloric acid (450 ml.).

After the ice has melted, the oil is separated from the aqueous phase and the latter thrice extracted with 500 ml. portions of ether. The combined organic and ether extracts are washed, first with 150 ml. of 5% hydrochloric acid, then twice with 150 ml. portions of water and finally dried over anhydrous sodium sulfate. The ether is removed by distillation and the residue distilled at reduced pressure using a still with a 30 inch column.

The fraction boiling at 100–110° C./0.1 mm. (122–138° C./1.5–2.9 mm.) is collected. The yield is 298 g. (94%). The product consists of a mixture of 2'-chloro-4'-methoxybutyrophenone and 2'-methoxy-4'-chlorobutyrophenone in about equal portions. Separation at this stage is difficult to obtain by the usual techniques. However, the corresponding phenols are easily separated, therefore the mixture is used for the following step.

STEP C.—2'-CHLORO-4'-HYDROXYBUTYROPHENONE

A 2-liter resin flask is equipped and assembled as described for the above reaction. n-Heptane (1500 ml.) is dried overnight over anhydrous aluminum chloride and placed in the reaction vessel with the mixture of 2'-chloro-4' - methoxybutyrophenone and 2'-methoxy - 4'-chlorobutyrophenone prepared in Step B (298.6 g., 1.4 mole). The stirrer is started and the aluminum chloride (373.4 g., 2.8 mole) is added over a period of 15 minutes. The temperature rises from 20° C. to 55° C.

The reaction mixture is refluxed for 3 hours using a steam bath as a heat source. There is a vigorous evolution of hydrogen chloride during this period and a viscous brown glass separates. Stirring becomes more difficult as the reaction progresses and may even have to be terminated. The reaction mixture is cooled to room temperature and the upper, heptane, phase decanted off. The residue is treated with a mixture of crushed ice (1 kg.) and concentrated hydrochloric acid (600 ml.). (A considerable amount of stirring and scraping is required to cause the aluminum complex to decompose.)

The mixture containing a yellow solid is thrice extracted with 500 ml. portions of ether. The combined ether extracts are washed with two 250 ml. portions of water and dried over anhydrous sodium sulfate. The ether is removed by distillation and the residue fractionated. The first fraction, B.P. 145° C./0.03 mm. (155° C./0.2 mm.), contains 2'-hydroxy-4'-chlorobutyrophenone and the second fraction, B.P. 160–178° C./0.03 mm. (155–175° C./0.2 mm.), is quite pure 2'-chloro-4'-hydroxybutyrophenone. The yield is 138 g. of 2'-chloro-4'-hydroxybutyrophenone which quickly solidifies upon cooling. Recrystallization of this material from cyclohexane (about 2 liters) gives a white crystalline product, M.P. 82.5–84° C. A second recrystallization gives little change in M.P.

Analysis for $C_{10}H_{11}ClO_2$.—Calculated: C, 60.46; H, 5.58; Cl, 17.85. Found: C, 60.15; H, 5.66; Cl, 17.77.

STEP D.—2-DIMETHYLAMINOMETHYL-2'-CHLORO-4'-HYDROXYBUTYROPHENONE

A 250 ml. round-bottomed flask is charged with 2'-chloro-4'-hydroxybutyrophenone (73.2 g., 0.368 mole), paraformaldehyde (14.4 g., 0.467 mole), dimethylamine hydrochloride (40 g., 0.475 mole), absolute ethyl alcohol (70 ml.) and concentrated hydrochloric acid (1.5 ml.). The solution is heated under anhydrous conditions at reflux for 3 hours and then the alcohol is removed in vacuo. The residual oil is shaken with water (120 ml.) and ether (100 ml.). The product separates from the water phase on standing. After recrystallization from water the product, 2 - dimethylaminomethyl-2'-chloro-4'-hydroxybutyrophenone, melts at 89–92° C.

Analysis for $C_{13}H_{18}NClO_2 \cdot HCl$.—Calculated: C, 53.43; H, 6.55; N, 4.79. Found: C, 52.94; H, 6.48; N, 4.59.

STEP E.—2-METHYLENE-2'-CHLORO-4'-HYDROXYBUTYROPHENONE

The 2-dimethylaminomethyl-2'-chloro - 4' - hydroxybutyrophenone of Step D is dissolved in 120 ml. of aqueous saturated sodium bicarbonate, kept 24 hours at room temperature, acidified with concentrated hydrochloric acid and extracted with ether. The ether is dried over sodium sulfate and the residue distilled to give 16 g. of 2-methylene-2'-chloro-4'-hydroxybutyrophenone which boils at 173° C./0.04 mm. and melts at 47–49° C.

Analysis for $C_{11}H_{11}ClO_2$.—Calculated: C, 62.71; H, 5.26. Found: C, 62.21; H, 5.20.

STEP F.—2-METHYLENE-2'-CHLORO-4'-ALLYLOXY-BUTYROPHENONE

A solution of sodium (0.92 g., 0.04 mole) in absolute ethanol (50 ml.) is added dropwise, under anhydrous conditions, to a stirred, refluxing solution of 2-methylene-2'-chloro-4'-hydroxybutyrophenone and allyl bromide (6.05 g., 0.05 mole) in anhydrous alcohol (50 ml.) during a 2.5 hour period. The mixture remains neutral during the addition. The mixture is refluxed for an additional 30 minutes and made faintly acidic with acetic acid. The precipitated sodium bromide is removed, the alcohol is evaporated and the residue taken up in ether. The ether solution is then washed with water, dilute sodium hydroxide, water and 2% acetic acid, dried over sodium sulfate and distilled to obtain 4.3 g. of 2-methylene-2'-chloro - 4' - allyloxybutyrophenone, B.P. 115–116° C./0.2 mm.

Analysis for $C_{14}H_{15}ClO_2$.—Calculated: C, 67.07; H, 6.03; Cl, 14.14. Found: C, 67.37; H, 5.86; Cl, 13.95.

EXAMPLE 2

*2-methylene-2',3'-dichloro-4'-allyloxybutyrophenone*

STEP A.—2,3-DICHLOROANISOLE

A five-liter, 4-necked round-bottomed flask is equipped with a stirrer, reflux condenser and two dropping funnels. 2,3-dichlorophenol (400 ml.) and 10 N sodium hydroxide (245 ml., 2.45 mole) are added. The temperature rises to 55° C. The mixture is heated to 80–85° C. on a steam bath and 10 N sodium hydroxide (615 ml., 6.15 mole) is placed in one dropping funnel and dimethyl sulfate (816 ml., 1090 g., 8.6 mole) in the other. The base and dimethyl sulfate are then added simultaneously in a dropwise manner over 3½ hours with stirring. Heating and stirring then is continued for 1 hour. The mixture then is cooled and water (600 ml.) is added. The oil that separates soon solidifies. The solid is collected by filtration and dissolved in ether (500 ml.). The filtrate is extracted with ether (400 ml.), the two ether solutions are combined and dried over anhydrous sodium sulfate. The ether is evaporated and the residue is dried in a vacuum desiccator over phosphorus pentoxide. The yield is 428 g. (98%) of 2,3-dichloroanisole; M.P. 32–33° C.

STEP B.—2',3'-DICHLORO-4'-HYDROXYBUTYROPHENONE

Butyryl chloride (128.0 g., 1.2 mole), 2,3-dichloroanisole (197.7 g., 1.11 mole), prepared as described in Step A, and carbon disulfide (400 ml.) are placed in a four-necked flask fitted with a mechanical stirrer, thermometer, reflux condenser (protected by a calcium chloride tube) and a Gooch sleeve bearing a 250 ml. Erlenmeyer flask containing anhydrous aluminum chloride (160 g., 1.2 mole). While the reaction mixture is cooled in an ice bath, the aluminum chloride is added in small portions with stirring at such a rate that the temperature of the reaction mixture does not exceed 20–25° C. The ice bath is removed and the mixture is stirred at room temperature for 1 hour, then in a water bath at 55° C. for 45 minutes and then kept at room temperature overnight. n-Heptane (400 ml.) and aluminum chloride (160 g., 1.2 mole) then are added. The condenser is set for distillation, the mixture is stirred and heated in a water bath heated by means of a steam bath and the carbon disulfide is distilled off. A second portion of heptane (400 ml.) is added, the condenser is set for reflux, the reaction mixture is stirred and heated in a bath at 80° C. for 3 hours and then allowed to cool. The heptane is decanted and the residue hydrolyzed by the slow addition of a solution of concentrated hydrochloric acid (120 ml.) in water (1500 ml.). The brown solid that separates is collected by suction filtration, washed well with water and dissolved in ether. The ether solution is extracted twice with a total of two liters of 5% sodium hydroxide. The sodium hydroxide extract is stirred with decolorizing carbon (2–3 teaspoons) and filtered by suction through a pad of diatomaceous earth. Upon acidification, a light brown solid separates. This is collected by filtration, washed with water and dried at 100° C. for 3 hours.

The dried solid is dissolved in hot benzene (1 liter) and the insoluble matter is removed by filtration. Upon cooling, a slightly colored solid separates. This is dissolved in hot benzene (750 ml.), the solution is allowed to cool to room temperature and then chilled to 10° C. in a refrigerator. The product (203 g., 85%); M.P. 109–110.5° C., is collected by filtration. The product is taken up in 1500 ml. of hot benzene, treated with decolorizing carbon and filtered. Upon cooling, a white solid identified as 2',3'-dichloro-4'-hydroxybutyrophenone (180 g., 75%); M.P. 109–110° C., separates.

Analysis for $C_{10}H_{10}Cl_2O_2$.—Calculated: C, 51.52; H, 4.32; Cl, 30.42. Found: C, 51.70; H, 4.24; Cl, 30.32.

STEP C.—2-DIMETHYLAMINOMETHYL-2',3'-DICHLORO-4'-HYDROXYBUTYROPHENONE HYDROCHLORIDE

2',3'-dichloro-4'-hydroxybutyrophenone (46.62 g., 0.2 mole), paraformaldehyde (12.01 g., 0.4 mole), dimethylamine hydrochloride (36.62 g., 0.4 mole), concentrated hydrochloric acid (1 ml.) and absolute ethanol (46 ml.) are combined and heated under reflux, protected from moisture, for 3 hours.

After standing overnight at room temperature, the reaction solution is concentrated under reduced pressure to a viscous oil. The residual oil is triturated with water (150 ml.) and filtered to remove a white solid which is shown to be starting phenol (29% recovered). The aqueous filtrate is extracted with ether and then concentrated to dryness under reduced pressure to give 62.3 g. of 2-dimethylaminomethyl - 2',3' - dichloro-4'-hydroxybutyrophenone hydrochloride, a white solid, M.P. 130–150° C.

Two recrystallizations from absolute ethanol give 27.3 g. (59%) of 2 - dimethylaminomethyl-2',3'-dichloro-4'-hydroxybutyrophenone melting at 156–159° C.

Analysis for $C_{13}H_{17}Cl_2NO_2(HCl)$.—Calculated: C, 47.80; H, 5.55; N, 4.29. Found: C, 47.77; H, 5.55; N, 4.25.

STEP D.—2-METHYLENE-2',3'-DICHLORO-4'-HYDROXYBUTYROPHENONE

2 - dimethylaminomethyl-2',3'-dichloro-4'-hydroxybutyrophenone hydrochloride (1.0 g., 0.00306 mole) is dissolved in water (25 ml.) and the solution made basic by the addition of saturated sodium bicarbonate solution. The colorless solution is heated on a steam bath (80–90° C.) for 30 minutes, cooled and made acid to Congo red test paper by the addition of 6 N hydrochloric acid. The resulting semisolid is extracted with ether and the combined extracts are dried over anhydrous magnesium sulfate. The ether is evaporated under reduced pressure to give 0.65 g. (87%) of 2-methylene-2',3'-dichloro-4'-hydroxybutyrophenone, M.P. 82–84° C.

Two recrystallizations from hexane give 2-methylene-2',3' - dichloro-4'-hydroxybutyrophenone in the form of white prisms melting at 84–85° C.

Analysis for $C_{11}H_{10}Cl_2O_2$.—Calculated: C, 53.90; H, 4.11; Cl, 28.93. Found: C, 53.78; H, 3.96; Cl, 29.03.

STEP E.—2-METHYLENE-2',3'-DICHLORO-4'-ALLYLOXYBUTYROPHENONE

By substituting 2-methylene-2',3'-dichloro-4'hydroxybutyrophenone for the 2-methylene-2'-chloro-4'-hydroxybutyrophenone of Example 1, Step F, and following substantially the procedure described therein the compound 2-methylene-2',3'-dichloro-4'allyloxybutyrophenone is obtained.

EXAMPLE 3

*2-methylene-2',3'-dichloro-4'-(2-propynyloxy) butyrophenone*

To a solution of sodium (0.46 g., 0.02 mole) in absolute ethanol (50 ml.) is added 2-methylene-2',3'-dichloro-4'-hydroxybutyrophenone (4.9 g., 0.02 mole). Then propargyl bromide (3.37 g., 0.0284 mole) is added and the resulting solution is heated under reflux for five hours.

After standing overnight at room temperature, the reaction mixture is filtered and the filtrate is concentrated to dryness under reduced pressure. The residue is dissolved in ether, washed with water, then with aqueous sodium bicarbonate solution and finally with water. The ether solution is dried over anhydrous magnesium sulfate and the solvent is evaporated under reduced pressure to give 5.46 g. of a solid, M.P. 58–65° C. Two recrystallizations from petroleum ether give 3.30 g. (58%) of 2-methylene-2',3'-dichloro-4'-(2-propynyloxy)butyrophenone in the form of colorless rods, M.P. 67.5–68.5° C.

Analysis for $C_{14}H_{12}Cl_2O_2$.—Calculated: C, 59.38; H, 4.27; Cl, 25.04. Found: C, 59.36; H, 4.26; Cl, 25.21.

EXAMPLE 4

*2-ethylidene-2',3'-dichloro-4'-(2-propynyloxy) butyrophenone*

STEP A.—2-ETHYL-2',3'-DICHLORO-4'-HYDROXYBUTYROPHENONE

A mixture of 2,3-dichloroanisole (53.11 g., 0.3 mole), carbon disulfide (350 ml.) and 2-ethylbutyryl chloride (80.77 g., 0.6 mole) is treated, under anhydrous conditions, with aluminum chloride powder (40.00 g., 0.3 mole) over a period of 5 minutes with stirring. The mixture is stirred for 6 hours at room temperature and then allowed to stand at room temperature overnight. The reaction mixture is heated with stirring in a 55° C. water bath until the evolution of hydrogen chloride ceases (1½ hours), cooled to room temperature and treated, under anhydrous conditions, with aluminum chloride powder (40.00 g., 0.3 mole) over a period of 5 minutes with stirring. The carbon disulfide is removed by distillation, an equal volume of dry heptane is added and the mixture is heated on a steam bath with stirring for 3 hours. After cooling to room temperature the heptane is decanted and the gummy residue is added to a mixture of ice (450 g.) and concentrated hydrochloric acid (45 ml.). The resulting oil is extracted with ether, dried over anhydrous sodium sulfate and the ether then removed under reduced pressure to give a semi-solid residue. This material is treated with excess 5% aqueous sodium hydroxide solution and heated under reflux for 1 hour, then cooled and extracted with ether to remove insoluble oil. The clear aqueous solution is acidified with concentrated hydrochloric acid and the residual oil is distilled to give 34.45 g. (44%) of 2-ethyl-2',3'-dichloro-4'-hydroxybutyrophenone in the form of a liquid, B.P. 140–142° C. at 0.5 mm. pressure. After three recrystallizations from hexane, 2-ethyl-2',3'-dichloro-4'-hydroxybutyrophenone is obtained in the form of white needles, M.P. 85–86° C.

Analysis for $C_{12}H_{14}Cl_2O_2$.—Calculated: C, 55.19; H, 5.40; Cl, 27.15. Found: C, 55.21; H, 5.64; Cl, 26.98.

STEP B.—2-BROMO-2-ETHYL-2',3'-DICHLORO-4'-HYDROXYBUTYROPHENONE

To a solution of 2-ethyl-2',3'-dichloro-4'-hydroxybutyrophenone (522 mg., 0.002 mole) in glacial acetic acid (15 ml.) is added a solution of bromine (319 mg., 0.002 mole) in glacial acetic acid (5 ml.), dropwise, over a period of 15 minutes. (The reaction is initiated by adding a drop of 48% hydrobromic acid solution at the beginning of the addition period.) Stirring is continued for an additional 15 minutes at room temperature.

The colorless reaction solution is poured into water (80 ml.) containing sodium bisulfite (80 mg.). The resulting white solid is collected, washed with water and dried. The yield is 643 mg. (95%) of product, M.P. 120.5–122.5° C. Recrystallization from a mixture of hexane and benzene gives prisms of 2-bromo-2-ethyl-2',3'-dichloro-4'-hydroxybutyrophenone, M.P. 122.5–123.5° C.

Analysis for $C_{12}H_{13}BrCl_2O_2$.—Calculated: C, 42.38; H, 3.85; Br, 23.50; Cl, 20.85. Found: C, 42.57; H, 3.92; Br, 23.38; Cl, 20.74.

STEP C.—2-ETHYLIDENE-2',3'-DICHLORO-4-HYDROXYBUTYROPHENONE

A mixture of 2-bromo-2-ethyl-2',3'-dichloro-4'-hydroxybutyrophenone (430 mg., 0.00126 mole), lithium chloride (160 mg., 0.00378 mole) and dimethylformamide (3 ml.) is heated on a steam bath, with stirring, for 2¼ hours.

The cooled reaction solution is poured, with stirring, into water (45 ml.). The resulting white solid is collected, washed with water and dried. The yield is 308 mg. (94%) of 2-ethylidene-2',3'-dichloro-4'-hydroxybutyrophenone, M.P. 117–119° C. Two recrystallizations from a mixture of hexane and benzene give prisms of 2-ethylidene-2',3'-dichloro-4'-hydroxybutyrophenone, M.P. 120–121° C.

Analysis for $C_{12}H_{12}Cl_2O_2$.—Calculated: C, 55.62; H, 4.67; Cl, 27.36. Found: C, 55.50; H, 4.71; Cl, 27.35.

STEP D.—2-ETHYLIDENE-2',3'-DICHLORO-4'-(2-PROPYNYLOXY)BUTYROPHENONE

By substituting 2-ethylidene-2',3'-dichloro-4'-hydroxybutyrophenone for the 2-methylene-2',3'-dichloro-4'-hydroxybutyrophenone of Example 3 and following substantially the procedure described therein, the compound 2-ethylidene-2',3'-dichloro - 4' - (2-propynyloxy)butyrophenone is prepared.

EXAMPLE 5

*2-methylene-2',3'-dimethyl-4'-allyloxybutyrophenone*

STEP A.—2',3'-DIMETHYL-4'-HYDROXYBUTYROPHENONE

To a well-stirred solution of butyryl chloride (60 g., 0.5 mole) and 2,3-dimethylanisole (68.09 g., 0.5 mole) in carbon disulfide (250 ml.), aluminum chloride (66.6 g., 0.5 mole) is added in portions during one hour. The reaction is very vigorous and hydrogen chloride is evolved. When the initial reaction is over the mixture is heated in a water bath at 55° C. for 1½ hours. Then a second portion of aluminum chloride (66.6 g.) is added, followed by 200 ml. of heptane and two ml. of dimethyl formamide. The condenser is set for downward distillation and the carbon disulfide is distilled. Heptane (100 ml.) is added and the mixture is heated at 90–100° C. for 3½ hours. After cooling the flask in an ice bath the heptane is decanted. The mixture in the flask is hydrolyzed by addition of ice (400 g.) followed by the addition of concentrated hydrochloric acid (100 ml.). The black, gummy material that forms is extracted with ether. The ether extract is washed with 6 N hydrochloric acid and water. The ether is evaporated and the residue is heated at 90–100° C. with 5% sodium hydroxide (500 ml.) for three hours to hydrolyze any phenolic ester present. The cooled mixture is extracted with ether and the basic aqueous solution obtained is filtered through a layer of diatomaceous earth and acidified with hydrochloric acid. The solid that separates is crystallized from benzene (125 ml.) to give 32 g. of 2',3'-dimethyl-4'-hydroxybutyrophenone which melts at 100–102° C.

Analysis for $C_{12}H_{16}O_2$.—Calculated: C, 74.97; H, 8.39. Found: C, 74.59; H, 7.89.

STEP B.—2-PIPERIDINOMETHYL-2',3'-DIMETHYL-4'-HYDROXYBUTYROPHENONE HYDROCHLORIDE

2',3'-dimethyl-4'-hydroxybutyrophenone (15.6 g., 0.08 mole), piperidine hydrochloride (9.22 g., 0.08 mole), paraformaldehyde (2.4 g., 0.08 mole) and glacial acetic acid (1 ml.) are mixed and heated at 90–100° C. for 3½ hours. The mixture then is extracted with 500 ml. of boiling water and the aqueous mixture is cooled and extracted with ether and made basic by the addition of solid sodium bicarbonate. The oil that separates is taken up in ether. The solution is dried over sodium sulfate and acidified with alcoholic hydrogen chloride to obtain 18 g. of 2-piperidinomethyl-2',3'-dimethyl-4'-hydroxybutyrophenone hydrochloride, M.P. 132–137° C. After drying over phosphorous pentoxide at one mm. pressure for a 24-hour period the 2-piperidinomethyl-2',3'-dimethyl-4'-hydroxybutyrophenone hydrochloride has a melting point of 158–162° C.

Analysis for $C_{18}H_{28}ClNO_2$.—Calculated: C, 66.33; H, 8.66; N, 4.30. Found: C, 66.00; H, 8.38; N, 4.27.

STEP C.—1-[2-(2,3-DIMETHYL-4-HYDROXYBENZOYL) BUTYL]-1-METHYLPIPERIDINIUM IODIDE

2 - piperidinomethyl - 2',3' - dimethyl - 4' - hydroxybutyrophenone hydrochloride (18.0 g., 0.055 mole) is suspended in water and the mixture is made basic by the addition of 10% sodium bicarbonate solution. The oil that separates is extracted with ether and the ether extract is dried and evaporated. To the residual oil is added 150 ml. of absolute alcohol and 36 ml. of methyl iodide. After refluxing for 1½ hours the mixture is cooled and absolute ether is added until no more precipitate forms. The oil that separates soon solidifies. Recrystallization of the solid from absolute ethanol gives 1-[2-(2,3-dimethyl-4-hydroxybenzoyl)butyl]-1-methylpiperidinium iodide, M.P. 195–196° C.

Analysis for $C_{19}H_{30}INO_2$.—Calculated: C, 52.90; H, 7.00; N, 3.25. Found: C, 53.13; H, 6.98; N, 3.45.

STEP D.—2-METHYLENE-2',3'-DIMETHYL-4'-HYDROXYBUTYROPHENONE

The 1 - [2 - (2,3 - dimethyl - 4 - hydroxybenzoyl)butyl]-1-methylpiperidinium iodide obtained in Step C is dissolved in four liters of water and the solution made basic with sodium bicarbonate, heated at 80–90° C. for ½ hour, cooled and acidified with hydrochloric acid. The solid that separates is crystallized from a large volume of ligroin to obtain 4.46 g. of 2-methylene-2',3'-dimethyl-4'-hydroxybutyrophenone, M.P. 73–74° C.

Analysis for $C_{13}H_{16}O_2$.—Calculated: C, 76.44; H, 7.90; Found: C, 76.61; H, 7.81.

STEP E.—2-METHYLENE-2',3'-DIMETHYL-4'-ALLYLOXYBUTYROPHENONE

By substituting 2 - methylene - 2',3' - dimethyl - 4'-hydroxybutyrophenone for the 2 - methylene - 2' - chloro-4'-hydroxybutyrophenone of Example 1, Step F, and following substantially the procedure described therein, the compound 2 - methylene - 2',3' - dimethyl - 4' - allyloxybutyrophenone is prepared.

EXAMPLE 6

*2-methyl-2'-chloro-4'-(2-propynyloxy)acrylophenone*

STEP A.—2'-CHLORO-4'-HYDROXYPROPIOPHENONE

By substituting an equimolar amount of propionyl chloride for the butyryl chloride employed in Example 1, Step B, and following substantially the procedure described in Steps B and C of Example 1, there is obtained 2'-chloro-4'-hydroxypropiophenone, M.P. 92–93° C.

Analysis for $C_9H_9ClO_2$.—Calculated: C, 58.55; H, 4.91; Cl, 19.21. Found: C, 58.37; H, 5.26; Cl, 18.95.

STEP B.—2-DIMETHYLAMINOMETHYL-2'-CHLORO-4'-HYDROXYPROPIOPHENONE

A solution of 2'-chloro-4'-hydroxypropiophenone (34.0 g., 0.184 mole), paraformaldehyde (7.2 g., 0.24 mole), dimethylamine hydrochloride (20.0 g., 0.245 mole) and 0.75 ml. of concentrated hydrochloric acid in absolute ethanol (30 ml.) are refluxed for two hours. On cooling, crude 2 - dimethylaminomethyl - 2' - chloro - 4' - hydroxypropiophenone separates as a granular solid. The solid is slurried with absolute ethanol (50 ml.), collected by filtration and washed with ether to obtain 35.1 g. of 2 - dimethylaminomethyl - 2' - chloro - 4' - hydroxypropiophenone. After crystallization from absolute alcohol the product melts at 145–146° C.

Analysis for $C_{12}H_{17}Cl_2NO_2$.—Calculated: C, 51.81; H, 6.16; N, 5.03. Found: C, 51.95; H, 6.21; N, 5.15.

STEP C.—2-METHYL-2'-CHLORO-4'-HYDROXYACRYLOPHENONE

2 - dimethylaminomethyl - 2' - chloro - 4' - hydroxypropiophenone (20.25 g., 0.073 mole) is dissolved in a minimum amount of water (70 ml.) and 10% sodium bicarbonate (20 ml.) is added. After ½ hour, the mixture is acidified with hydrochloric acid and the yellow, pasty solid that separates is extracted with ether. The aqueous phase is again made basic by the addition of solid sodium bicarbonate, maintained at room temperature for 16 hours and acidified and extracted with ether. The combined ether extracts are dried over sodium sulfate and evaporated. The residue is crystallized from ether-ligroin to obtain 7.8 g. of 2-methyl-2'-chloro-4'-hydroxyacrylophenone, M.P. 75.5–76.5° C.

Analysis for $C_{10}H_9ClO_2$.—Calculated: C, 61.08; H, 4.61; Cl, 18.03. Found: C, 60.75; H, 4.81; Cl, 17.91.

STEP D.—2-METHYL-2'-CHLORO-4'-(2-PROPYNYLOXY) ACRYLOPHENONE

By substituting 2 - methyl - 2'-chloro-4'-hydroxyacrylophenone for the 2-methylene-2',3'-dichloro-4'-hydroxybutyrophenone of Example 3 and following substantially the procedure described therein, the compound 2-methyl-2'-chloro-4'-(2-propynyloxy)acrylophenone is prepared.

EXAMPLE 7

*2-methylene-2',4'-dimethyl-5'-(2-propynyloxy) butyrophenone*

STEP A.—2',4'-DIMETHYL-5'-HYDROXYBUTYROPHENONE 2,4 - dimethyl - 5 - aminobutyrophenone (119.5 g., 0.63 mole) [C.A., Vol. 16: p. 414[5]] in a solution of 190 cc. of sulfuric acid and 945 cc. of water is diazotized at 5° C.

with 46 g. (0.67 mole) of sodium nitrite. The resulting diazonium salt solution is then heated on a steam bath for 30 minutes. The phenol separates as an oil which crystallizes when the mixture is cooled and the said product is taken up in ether, extracted into a 5% sodium hydroxide solution and reprecipitated by acidification with dilute hydrochloric acid. Recrystallization from ethanol gives 76.5 g. of 2',4'-dimethyl-5'-hydroxybutyrophenone, M.P. 95–100° C. A small sample recrystallized from ethanol for analysis gives a melting point of 100.5–102° C.

Analysis for $C_{12}H_{16}O_2$.—Calculated: C, 74.97; H, 8.39. Found: C, 74,41; H, 8.29.

STEP B.—2-METHYLENE-2',4'-DIMETHYL-5'-HYDROXYBUTYROPHENONE

By substituting the 2',4'-dimethyl-5'-hydroxybutyrophenone of Step A for the 2'-chloro-4'-hydroxybutyrophenone of Example 1, Step D, and following substantially the procedure described therein, the compound 2-dimethylaminomethyl-2',4'-dimethyl-5'-hydroxybutyrophenone hydrochloride is prepared; which amine is then treated according to the procedure described in Step E of Example 1 to produce the compound 2-methylene-2',4'-dimethyl-5'-hydroxybutyrophenone.

STEP C.—2-METHYLENE-2',4'-DIMETHYL-5'-(2-PROPYNYLOXY) BUTYROPHENONE

By substituting 2-methylene-2',4'-dimethyl-5'-hydroxybutyrophenone for the 2-methylene-2',3'-dichloro-4'-hydroxybutyrophenone of Example 3 and following substantially the procedure described herein, the compound 2 - methylene - 2',4' - dimethyl - 5' - (2 - propynyloxy) butyrophenone is prepared.

EXAMPLE 8

*2-methyl-2'-chloro-5'-allyloxyacrylophenone*

STEP A.—2'-CHLORO-5'-NITROPROPIOPHENONE

2'-chloropropiophenone (84.5 g., 0.5 mole) is added to 300 cc. of fuming nitric acid (d.1.4) at a temperature of 5 to 10° C. during 18 minutes. The mixture is allowed to stand at 0–5° C. for 30 minutes and then poured into ice water. The solid product is recrystallized from isopropyl alcohol to obtain 75 g. of 2'-chloro-5'-nitropropiophenone, M.P. 52–56° C. After recrystallization from isopropyl alcohol the product melts at 54–56° C.

Analysis for $C_9H_8ClNO_3$.—Calculated: C, 50.60; H, 3.77; N, 6.56. Found: C, 51.47; H, 4.01; N, 6.62.

STEP B.—2'-CHLORO-5'-AMINOPROPIOPHENONE

A solution of 2'-chloro-5'-nitropropiophenone (25.9 g., 0.121 mole) in 60 cc. of acetic acid is added to 240 cc. of a 7.5 N hydrochloric acid solution in which is dissolved 100 g. of stannous chloride dihydrate. The solution is heated one hour on the steam bath and then made basic by the addition of a sodium hydroxide solution. The oily product is then taken up in ether and evaporated to obtain 18.0 g. of a yellow oil identified as 2'-chloro-5'-aminopropiophenone. This material is purified by collecting the fraction boiling at 143–146° C./0.5 mm.

Analysis for $C_9H_{10}ClNO$.—Calculated: C, 58.86, H, 5.49; N, 7.63. Found: C, 59.10; H, 5.58; N, 7.54.

STEP C.—2'-CHLORO-5'-HYDROXYPROPIOPHENONE

2'-chloro-5'-aminopropiophenone (48.5 g., 0.26 mole) is dissolved in 192 cc. of water and 26 cc. of concentrated sulfuric acid and diazotized with a solution of 17.9 g. (0.26 mole) of sodium nitrite in 40 cc. of water. The diazonium mixture is then added dropwise during 30 minutes to a stirred mixture of 340 cc. of 1 N sulfuric acid containing 48.0 g. of cupric sulfate pentahydrate, and 250 cc. of toluene.

The toluene layer is then separated and extracted with a 5% solution of sodium hydroxide and acidified with hydrochloric acid to obtain an oily product which is purified by distillation. There is thus obtained 13.0 g. of 2'-chloro-5'-hydroxypropiophenone, B.P. 135–140° C./0.5 mm.

STEP D.—2-METHYL-2'-CHLORO-5'-HYDROXYACRYLOPHENONE

By substituting the 2'-chloro-5'-hydroxypropiophenone of Step C for the 2'-chloro-4'-hydroxybutyrophenone of Example 1, Step D, and following substantially the procedure described therein the compound 2-dimethylaminomethyl-2'-chloro-5'-hydroxypropiophenone hydrochloride is prepared, which amine is then treated according to the procedure described in Step E of Example 1 to produce the compound 2 - methyl - 2' - chloro - 5'-hydroxyacrylophenone.

STEP E.—2-METHYL-2'-CHLORO-5'-ALLYLOXYACRYLOPHENONE

By substituting 2-methyl-2'-chloro-5'-hydroxyacrylophenone for the 2-methylene-2'-chloro-4'-hydroxybutyrophenone of Example 1, Step F, and following substantially the procedure described therein, the compound 2-methyl-2'-chloro-5'-allyloxyacrylophenone is prepared.

EXAMPLE 9

*2-methylene-3',5'-dichloro-6'-allyloxybutyrophenone*

STEP A.—2',4'-DICHLORO-6'-HYDROXYBUTYROPHENONE

To a solution of 3,5-dichlorophenol (24.4 g., 0.15 mole) in 60 cc. of pyridine is added, over a 15-minute period while cooling on an ice bath, 19.3 g. (0.18 mole) of butyryl chloride. The mixture is permitted to stand one hour at room temperature and then diluted with 300 cc. of water. The oily product is then taken up in ether and the ether solution washed thoroughly with dilute hydrochloric acid and water, dried and the ether evaporated to leave 33.2 g. of the butyric acid ester of 3,5-dichlorophenol in the form of a liquid.

The butyric acid ester of 3,5-dichlorophenol is mixed with 38.5 g. (0.29 mole) of aluminum chloride and the mixture heated 1.6 hours on the steam bath. The reaction mixture is then poured onto ice and the solid product obtained is recrystallized from ligroin to obtain 21.5 g. of 2',4'-dichloro-6'-hydroxybutyrophenone, M.P. 45–48° C. A small sample recrystallized further from ligroin gives a constant M.P. of 47–48.5° C.

Analysis for $C_{10}H_{10}Cl_2O_2$.—Calculated: C, 51.52; H, 4.32. Found: C, 52.37; H, 4.35.

STEP B.—2-METHYLENE-2',4'-DICHLORO-6'-HYDROXYBUTYROPHENONE

By substituting 2',4'-dichloro-6'-hydroxybutyrophenone for the 2'-chloro-4'-hydroxybutyrophenone of Example 1, Step D, and following substantially the procedure described therein the compound 2-dimethylaminomethyl-2',4' - dichloro-6'-hydroxybutyrophenone hydrochloride is prepared; which amine is then treated according to the procedure described in Step E of Example 1 to produce the compound 2-methylene-2',4'-dichloro-6'-hydroxybutyrophenone.

STEP C.—2-METHYLENE-3',5'-DICHLORO-6'-ALLYLOXYBUTYROPHENONE

By substituting 2-methylene-2',4'-dichloro-6'-hydroxybutyrophenone for the 2-methylene-2'-chloro4'-hydroxybutyrophenone of Example 1, Step F, and following substantially the procedure described therein, the compound 2 - methylene-3',5'-dichloro-6'-allyloxybutyrophenone is prepared.

EXAMPLE 10

*2-methylene-2',6'-dichloro-3'-(2-propynyloxy)butyrophenone*

STEP A.—2,6-DICHLORO-3-METHOXY-α-PROPYL-BENZYL ALCOHOL 2,6-dichloro-3-methoxybenzaldehyde (109 g., 0.53 mole) is added to a solution of propylmagnesium bromide [prepared by the reaction of 72.4 g. (0.59 mole) of propyl bromide with 14.4 g. (0.59 mole) of magnesium] in 600 cc. of ether over a period of ½ hour. The mixture is refluxed for 1½ hours and poured into ice-cold dilute hydrochloric acid. The ether layer is then separated, washed with water, dried over sodium sulfate and evaporated to give 126 g. of a yellow oil identified as 2,6-dichloro-3-methoxy-α-propylbenzyl alcohol.

STEP B.—2',6'-DICHLORO-3'-METHOXYBUTYROPHENONE

A solution of 2,6-dichloro-3-methoxy-α-propylbenzyl alcohol (126 g., 0.51 mole) and sodium dichromate dihydrate (98.5 g., 0.333 mole) in 150 cc. of water and 400 cc. of acetic acid is heated one hour on the steam bath. The solution is diluted with 2.5 liters of water to produce an oily product which is then taken up in ether, the ether solution washed with water and sodium bicarbonate solution and then dried over sodium sulfate. Evaporation of the ether gives 119 g. of 2',6'-dichloro-3'-methoxybutyrophenone in the form of a yellow oil.

STEP C.—2',6'-DICHLORO-3'-HYDROXYBUTYROPHENONE

A mixture of 2',6'-dichloro-3'-methoxybutyrophenone (119 g., 0.48 mole) and aluminum chloride (191 g., 1.44 mole) in 600 cc. of heptane is stirred and heated for 2½ hours on the steam bath. The heptane is decanted from the viscous precipitate and the precipitate hydrolyzed by the addition of ice in dilute hydrochloric acid. The oily product obtained is then taken up in ether and purified by distillation to give 76.5 g. of 2',6'-dichloro-3'-hydroxybutyrophenone, B.P. 148–150° C./1.5 mm., $n_D^{26}$ 1.5558.

Analysis for $C_{10}H_{10}Cl_2O_2$: Calculated: C, 51.52; H, 4.32; Found: C, 51.67; H, 4.57.

STEP D.—2-METHYLENE-2',6'-DICHLORO-3'-HYDROXYBUTYROPHENONE

By substituting 2,6-dichloro-3-hydroxybutyrophenone for the 2'-chloro-4'-hydroxybutyrophenone of Example 1, Step D, and following substantially the procedure described therein, the compound 2-dimethylaminomethyl-2',6'-dichloro-3'-hydroxybutyrophenone hydrochloride is prepared; which amine is then treated according to the procedure described in Step E of Example 1 to produce the compound 2-methylene-2',6'-dichloro-3'-hydroxybutyrophenone.

STEP E.—2-METHYLENE-2',6'-DICHLORO-3'-(2-PROPYNYLOXY)BUTYROPHENONE

By substituting 2-methylene-2',6'-dichloro-3'-hydroxybutyrophenone for the 2-methylene-2',3'-dichloro-4'-hydroxybutyrophenone of Example 3 and following substantially the procedure described therein, the compound 2 - methylene - 2',6'-dichloro-3'-(2-propynyloxy)butyrophenone is prepared.

EXAMPLE 11

STEP A.—3-TRIFLUOROMETHYL-4-BROMOPHENYL ALLYL ETHER 3-trifluoromethyl-4-bromophenol (12.05 g., 0.05 mole) dissolved in methanol is added to a solution of 2.81 g. (0.05 mole) of potassium hydroxide in 35 ml. of an 85% methanol solution. The methanol is evaporated and the residue is dissolved in 50 ml. of glycol dimethyl ether (i.e., glyme). Allyl bromide (6.05 g., 0.05 mole) is added and the mixture is refluxed for 1½ hours. After removal of the potassium bromide, the solvent is evaporated and the residue distilled to obtain 10.5 g. of 3-trifluoromethyl-4-bromophenyl allyl ether, B.P. 78° C./1 mm.

STEP B.—3-TRIFLUOROMETHYL-4-(1-HYDROXYBUTYL)PHENYL ALLYL ETHER

To a mixture of 2.60 g. (0.14 mole) of magnesium turnings in 150 ml. of ether there is added 20 g. (0.0712 mole) of 3-trifluoromethyl-4-bromophenyl allyl ether. The reaction is initiated and maintained by the slow addition of 12.4 g. (0.0712 mole) of ethylene bromide. After the magnesium has been consumed, 5.12 g. (0.0712 mole) of butyraldehyde is added and the mixture is refluxed for 1½ hours, cooled and added to a saturated ammonium chloride solution. The product is isolated by extraction with ethyl ether and the ether extract distilled to obtain 11.0 g. of an oil having a boiling point of 70–102° C./0.3 mm. The oil (7.92 g.) is placed on a 4 cm. column of 350 g. of alumina and eluted with benzene until the effluent contains no solute. The product is then eluted with a 2:1 mixture of benzene and ether and then with a 1:2 mixture of benzene and ether until the effluent contains no solute. The combined benzene-ether effluents are evaporated to obtain 5.5 g. of 3-trifluoromethyl-4-(1-hydroxybutyl)phenyl allyl ether ($n_D^{25}$ 1.4836).

STEP C.—2'-TRIFLUOROMETHYL-4'-ALLYLOXYBUTYROPHENONE 3-trifluoromethyl-4-(1-hydroxybutyl)phenyl allyl ether (5.3 g., 0.0193 mole) is dissolved in 30 ml. of acetone and the solution maintained at 0° C. while a solution of 3.86 g. (0.0396 mole) of chromium trioxide in a mixture of 10 ml. of water and 3.26 ml. of concentrated sulfuric acid is added slowly with stirring. After stirring for an additional two hours, cold water is added and the mixture is extracted with ether. After drying the extract thus obtained with sodium sulfate, the ether is evaporated and the residue distilled at 0.3 mm. to yield 4.9 g. of 2'-trifluoromethyl-4'-allyloxybutyrophenone.

STEP D.—2-METHYLENE-2'-TRIFLUOROMETHYL-4'-ALLYLOXYBUTYROPHENONE

By substituting 2'-trifluoromethyl - 4' - allyloxybutyrophenone for the 2'-chloro-4'-hydroxypropiophenone of Example 6, Step B, and following substantially the procedure described in Steps B and C of that example, the compound 2-methylene - 2' - trifluoromethyl-4'-allyloxybutyrophenone is prepared.

By substituting the appropriate nuclear hydroxy substituted alkanophenone and secondary amine hydrochloride for the 2'-chloro-4'-hydroxybutyrophenone and dimethylamine hydrochloride of Example 1, Step D, and the appropriate olefinic or acetylenic bromide for the allyl bromide of Example 1, Step F, and following substantially the procedure described in Steps D, E and F of that example, all of the products set forth in Table I, infra, may be obtained. The equations which follow, wherein the x represents the integer 1 or a number greater than 1, illustrates the reaction of Example 1, Steps D, E and F and, together with Table I, describes the reactants employed therein:

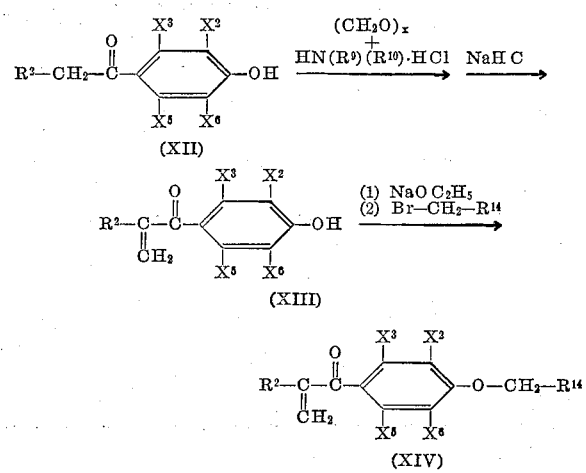

TABLE #I

| Ex. | $R^2$ | $R^9$ | $R^{10}$ | $R^{14}$ | $X^2$ | $X^3$ | $X^5$ | $X^6$ |
|---|---|---|---|---|---|---|---|---|
| 12 | —⟨S⟩ (thienyl) | —$CH_3$ | —$CH_3$ | —$CH=CH_2$ | H | Cl | H | H |
| 13 | —$C_2H_5$ | —$CH_3$ | —$CH_3$ | —C≡CH | —CH=CH—CH=CH— | | H | H |
| 14 | —$CH_2$—⟨⟩ (benzyl) | —$CH_3$ | —$CH_3$ | —C≡CH | H | Cl | H | H |
| 15 | —⟨⟩ (phenyl) | —$CH_3$ | —$CH_3$ | —CH=C(⟨⟩)$_2$ | H | Cl | H | H |
| 16 | —$C_2H_5$ | —$CH_2$—$CH_2$—$CH_2$—$CH_2$—$CH_2$— | | —$CH=C(CH_3)_2$ | —$CH_3$ | Cl | H | H |
| 17 | —$C_2H_5$ | —$CH_3$ | —$CH_3$ | —$CH=C(CH_3)_2$ | Cl | —$CH_3$ | H | H |
| 18 | —$CH(CH_3)_2$ | —$CH_2$—$CH_2$—$CH_2$—$CH_2$—$CH_2$— | | —C≡C—$CH_3$ | H | Cl | H | H |
| 19 | —$CH(CH_3)_2$ | —$CH_3$ | —$CH_3$ | —$CH=CHC_2H_5$ | Cl | Cl | H | H |
| 20 | —$CH_2$—$CF_3$ | —$CH_3$ | —$CH_3$ | —$CH=CH_2$ | —$CH_3$ | —$CH_3$ | H | H |
| 21 | —$CH(CH_3)(CF_3)$ | —$CH_3$ | —$CH_3$ | —$CH=C(CH_3)_2$ | H | —$CH_3$ | H | H |
| 22 | —$C_2H_5$ | —$CH_2$—$CH_2$—$CH_2$—$CH_2$—$CH_2$— | | —CH=C(⟨⟩)$_2$ | H | —$CH_3$ | —$CH_3$ | H |
| 23 | —$C_2H_5$ | —$CH_3$ | —$CH_3$ | —C≡CH | —$CH_3$ | —$CH_3$ | —$CH_3$ | —$CH_3$ |
| 24 | —⟨⟩—$CH_3$ (tolyl) | —$CH_3$ | —$CH_3$ | —CH=C(⟨⟩)$_2$ | H | Cl | H | H |
| 25 | —$CH_2$—⟨⟩—Cl | —$CH_3$ | —$CH_3$ | —C≡CH | H | Cl | H | H |

EXAMPLE 26

*2-methyl-2'-chloro-4'-methoxyacrylophenone*

STEP A.—2'-CHLORO-4'-METHOXYPROPIOPHENONE

Into a one-liter, four-necked round bottom flask equipped with a stirrer, dropping funnel, thermometer and reflux condenser is added 2'-chloro-4'-hydroxypropiophenone (46.15 g., 0.25 mole) in methanol (125 ml.). To this solution is added sodium hydroxide (22.0 g., 0.55 mole) in water (35 ml.) at 45° C. Dimethyl sulfate (97.12 g., 0.77 mole) is added dropwise at such a rate as to keep the temperature at approximately 50° C. The reaction mixture is kept alkaline by the dropwise addition of a 40% sodium hydroxide solution (50 ml.). When the addition of dimethyl sulfate is complete, the reaction mixture is heated for three hours on a steam bath.

The mixture is cooled and filtered to remove inorganic salts. The filtrate is extracted with ether and the unreacted 2'-chloro-4'-hydroxypropiophenone is removed by extraction with a 5% sodium hydroxide solution (100 ml.). The ethereal solution is dried over anhydrous sodium sulfate, then filtered and the ether removed by evaporation. The residual material is fractionally distilled. The yield of 2'-chloro-4'-methoxypropiophenone thus obtained is 27.3 g. (55%), B.P. 159–160° C./16 mm.; M.P. 27–28° C.

Analysis for $C_{10}H_{11}ClO_2$.—Calculated: C, 60.46; H, 5.58; Cl, 17.85. Found: C, 60.83; H, 5.38; Cl, 17.59.

STEP B.—2-DIMETHYLAMINOMETHYL-2'-CHLORO-4'-METHOXYPROPIOPHENONE HYDROCHLORIDE

A mixture of 2'-chloro-4'-methoxypropiophenone (27.0 g., 0.136 mole), paraformaldehyde (5.43 g., 0.181 mole), dimethylamine hydrochloride (14.6 g., 0.181 mole), absolute alcohol (23 ml.) and concentrated hydrochloric acid (0.5 ml.) is stirred and heated on a steam bath for six hours, cooled and slowly diluted with ether until precipitation of an oily product ceases. The oil soon solidifies and is collected. The solid is triturated with ether, collected again and crystallized from isopropyl alcohol. The 11.7 g. of 2-dimethylaminomethyl-2'-chloro-4'-methoxypropiophenone hydrochloride thus obtained melts at 128–130° C.

Analysis for $C_{13}H_{18}ClNO_2 \cdot HCl$.—Calculated: C, 53.43; H, 6.55; Cl, 24.27; N, 4.79. Found: C, 53.12; H, 6.76; Cl, 24.43; N, 4.87.

STEP C.—2-METHYL-2'-CHLORO-4'-METHOXY-ACRYLOPHENONE

2 - dimethylaminomethyl - 2'-chloro-4'-methoxypropiophenone hydrochloride (9.7 g., 0.035 mole) is dissolved in water (50 ml.) and the solution is made basic by the addition of a 10% sodium bicarbonate solution. The mixture is heated at 80–90° C. for 45 minutes, cooled, acidified with hydrochloric acid and extracted with ether.

The ether solution is washed with dilute hydrochloric acid, then with a 2% solution of sodium bicarbonate and finally with water and dried over sodium sulfate. The ether is then evaporated and the residue distilled to obtain 2.9 g. of 2-methyl-2'-chloro-4'-methoxyacrylophenone, B.P. 102° C./0.25 mm.

Analysis for $C_{11}H_{11}ClO_2$.—Calculated: C, 62.70; H, 5.26; Cl, 16.83. Found: C, 62.41; H, 5.37; Cl, 16.70.

In a manner similar to that described in Example 26 all of the nuclear alkoxy substituted alkanophenones (XVI, infra) of the invention may be prepared. The following equations illustrate the method of Example 26, Steps A–C and, together with Table II, depict the preparation of various alkoxy substituted alkanophenone products which may be obtained thereby. The hydroxy substituted alkanophenones (XV) employed as starting materials in the following reaction are prepared according to the method described in Example 1, Steps A through C, by the reaction of a nuclear substituted or nuclear unsubstituted phenol with dimethyl sulfate according to the method described in Example 1, Step A, treating the anisole derivative thus obtained with an appropriate alkanoyl halide according to the method described in Example 1, Step B, and then converting the said anisole derivative to its corresponding nuclear hydroxy substituted alkanophenone by the procedure described in Step C of Example 1. The following equation, wherein $x$ is a number having a value greater than 1, illustrates the reaction:

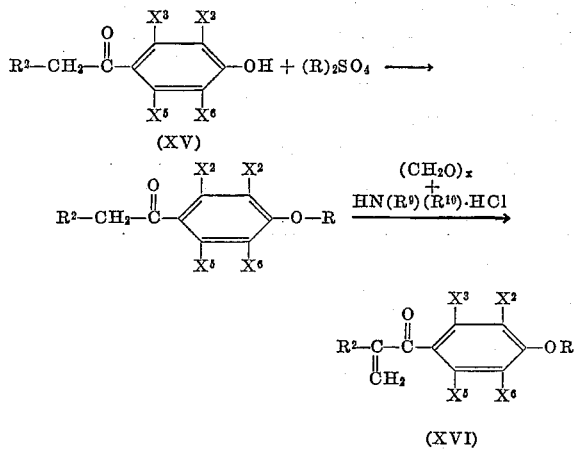

wherein R is a member selected from the group consisting of lower alkyl, a lower alkenyl radical of the formula: $-CH_2-CH=C(R^3)(R^4)$ and a lower alkynyl radical of the formula: $-CH_2-C\equiv CR^5$ wherein each of the foregoing $R^3$, $R^4$ and $R^5$ moieties represent similar or dissimilar radicals selected from the group consisting of hydrogen, lower alkyl, aryl, and aralkyl; $R^1$ is a member selected from the group consisting of hydrogen and lower alkyl; $R^2$ is a member selected from the group consisting of hydrogen, lower alkyl, trifluoromethyl-lower alkyl, mononuclear cycloalkyl containing 3–6 nuclear carbon atoms, aryl and aralkyl; X represents similar or dissimilar radicals selected from the group consisting of hydrogen, halogen, trifluoromethyl, lower alkyl and, when substituted on adjacent carbon atoms of the benzene nucleus, two X radicals are combined to form a hydrocarbylene chain selected from the group consisting of tetramethylene and 1,3-butadienylene; and $n$ is an integer having a value of 1–4.

TABLE II

| Ex. | R | $R^2$ | $R^9$ | $R^{10}$ | $X^2$ | $X^3$ | $X^5$ | $X^6$ |
|---|---|---|---|---|---|---|---|---|
| 27 | $-C_2H_5$ | $-C_2H_5$ | $-CH_3$ | $-CH_3$ | H | H | H | H |
| 28 | $-CH_3$ | $-CH_3$ | $-CH_3$ | $-CH_3$ | H | Cl | H | H |
| 29 | $-CH_3$ | $-C_2H_5$ | $-CH_3$ | $-CH_3$ | Cl | Cl | H | H |
| 30 | $-(CH_2)_2-CH_3$ | $-CH_2-CF_3$ | $-CH_3$ | $-CH_3$ | $-CH_3$ | $-CH_3$ | H | H |
| 31 | $-CH_3$ | $-C_2H_5$ | $-CH_3$ | $-CH_3$ | $-CH_3$ | $-CH_3$ | $-CH_3$ | $-CH_3$ |

The diuretic and saluretic activity of the instant products makes them useful in the treatment of conditions usually associated with edema. Edematous conditions which may be treated by the products of the invention include, for example, hypertension, congestive heart failure, kidney malfunctioning, cirrhosis of the liver and other diseases associated with electrolyte and fluid retention.

The products of the invention can be administered in therapeutic dosages in conventional vehicles as, for example, by oral administration in the form of a tablet as well as by intravenous injection. Also, the dosage of the products may be varied over a wide range as, for example, in the form of scored tablets containing 25, 50, 100, 150, 250 and 500 milligrams of the active ingredients for the symptomatic adjustment of the dosage to the patient to be treated. These dosages are well below the toxic or lethal dose of the products.

It will be apparent from the foregoing description that the products of this invention constitute a valuable class of compounds which have not been prepared heretofore. One skilled in the art will also appreciate that the processes disclosed in the above examples are merely illustrative and are capable of wide variation and modification without departing from the spirit of this invention.

What is claimed is:

1. A compound of the formula:

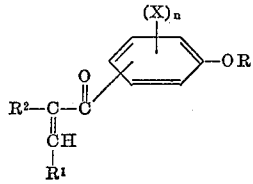

2. A compound of the formula:

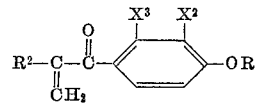

wherein R is a member selected from the group consisting of lower alkyl, a lower alkenyl radical of the formula: $-CH_2-CH=C(R^6)(R^7)$ and a lower alkynyl radical of the formula: $-CH_2-C\equiv C(R^8)$ wherein each of the foregoing $R^6$, $R^7$ and $R^8$ moieties represent similar or dissimilar radicals selected from the group consisting of hydrogen and lower alkyl; $R^2$ is a member selected from the group consisting of lower alkyl and trifluoromethyl-lower alkyl; and $X^2$ and $X^3$ each represent similar or dissimilar radicals selected from the group consisting of hydrogen, halogen and lower alkyl.

3. 2 - methylene-4'-alkoxyalkanophenone wherein the phenone nucleus is substituted by one to two halogen atoms.

4. 2 - methylene - 4'-alkenyloxyalkanophenone wherein the phenone nucleus is substituted by one to two halogen atoms.

5. 2 - methylene - 4'-alkynyloxyalkanophenone wherein the phenone nucleus is substituted by one to two halogen atoms.

6. 2 - methylene - 4'-alkoxyalkanophenone wherein the phenone nucleus is substituted by one to two lower alkyl groups.

7. 2 - methylene - 4'-alkenyloxyalkanophenone wherein the phenone nucleus is substituted by one to two lower alkyl groups.

8. 2 - methylene - 4'-alkynyloxyalkanophenone wherein the phenone nucleus is substituted by one to two lower alkyl groups.

9. 2-methylene-4'-alkenyloxyalkanophenone wherein the phenone ring contains two nuclear substituents, one of which is halogen and the other a lower alkyl group.

10. 2-methylene-2'-chloro-4'-allyloxybutyrophenone.

11. 2-methylene-2',3'-dichloro-4'-allyloxybutyrophenone.

12. 2-methylene-2',3'-dichloro-4'-(2-propynyloxy)butyrophenone.

13. 2-ethylidene-2',3'-dichloro-4'-(2-propynyloxy)butyrophenone.

14. 2-methylene-2',3'-dimethyl-4'-allyloxybutyrophenone.

15. 2-methylene-2',6'-dichloro-3'-(2-propynyloxy)butyrophenone.

16. 2-methylene-3'-trifluoromethyl-4'-allyloxybutyrophenone.

17. 2-methyl-2'-chloro-4'-methoxyacrylophenone.

References Cited
UNITED STATES PATENTS

| | | | |
|---|---|---|---|
| 2,644,012 | 6/1953 | Korman | 260—592 |
| 2,778,853 | 1/1957 | Schultz | 260—590 |

DANIEL D. HORWITZ, *Primary Examiner.*